United States Patent Office 2,800,228
Patented July 23, 1957

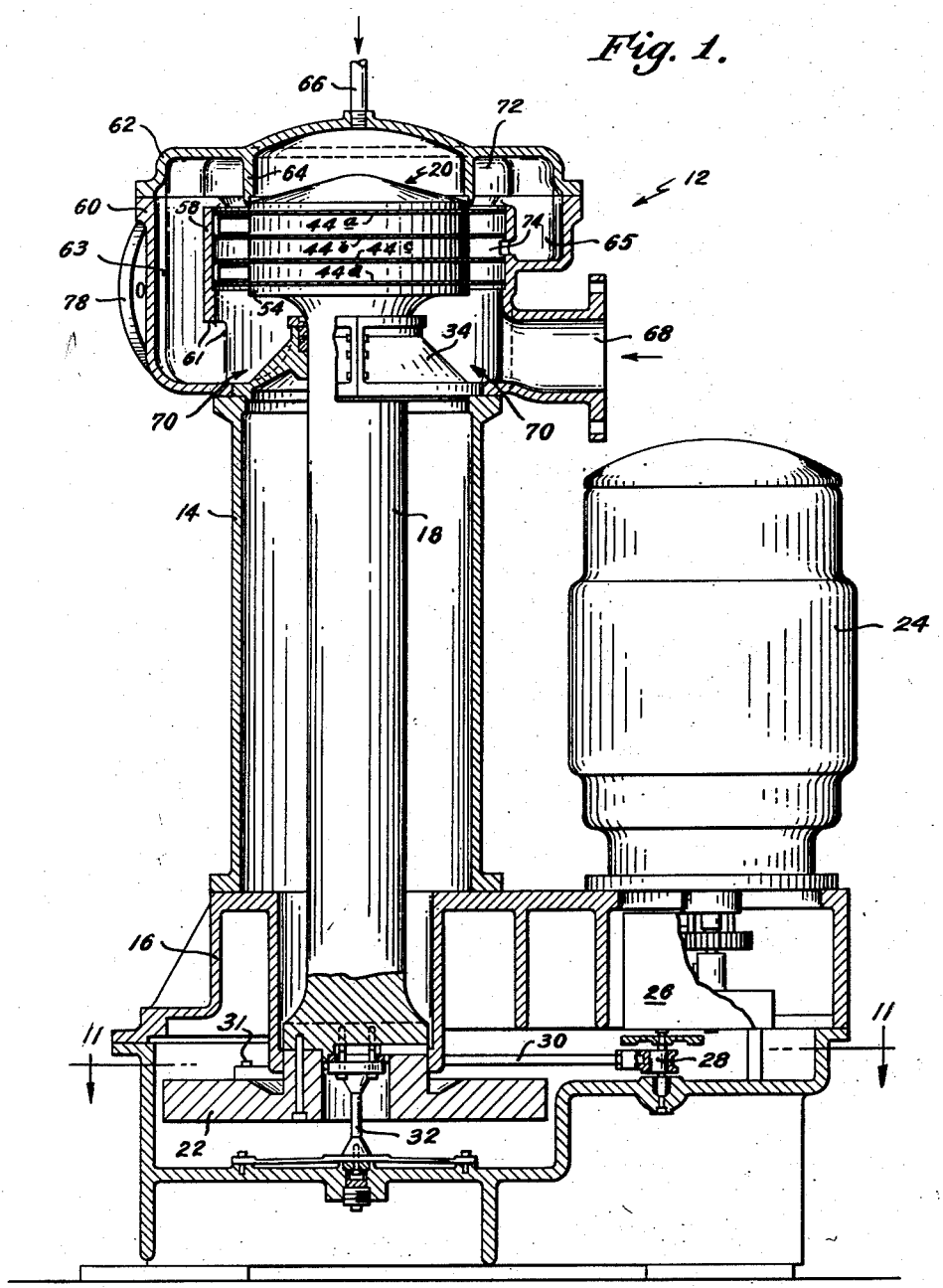

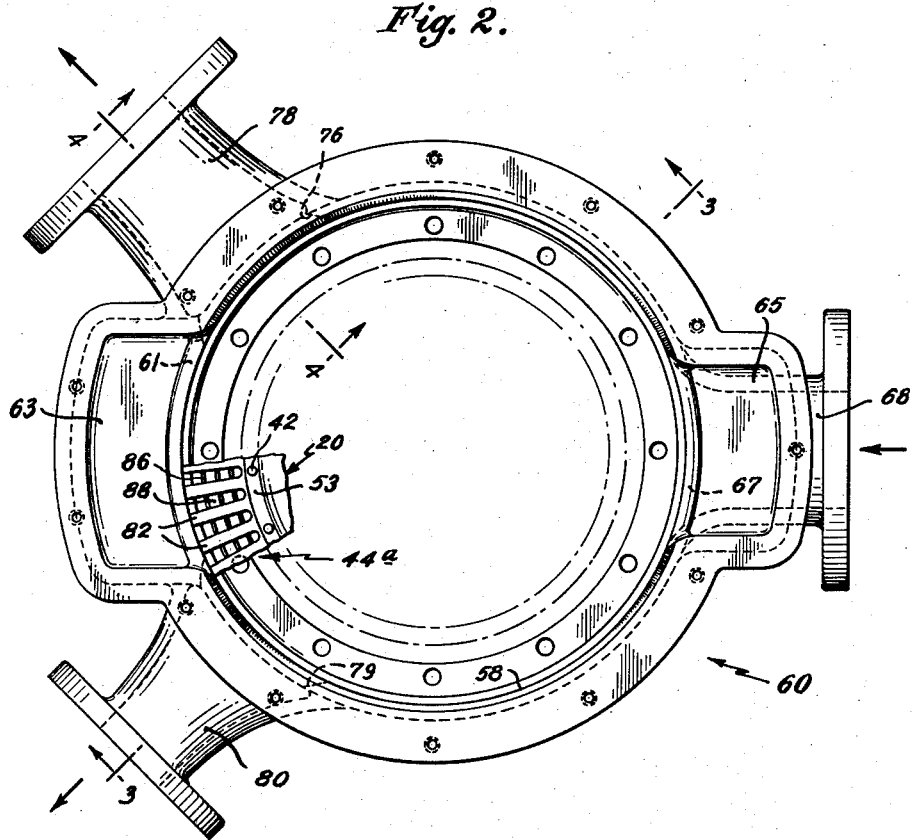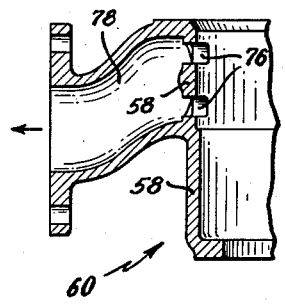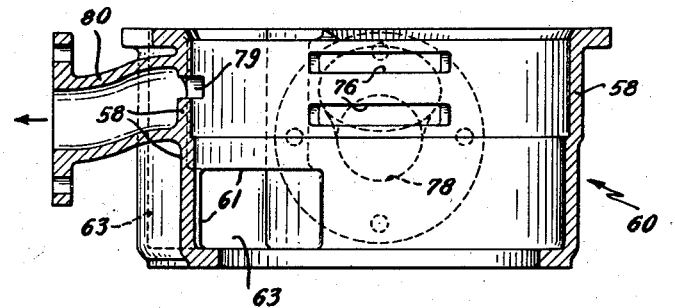

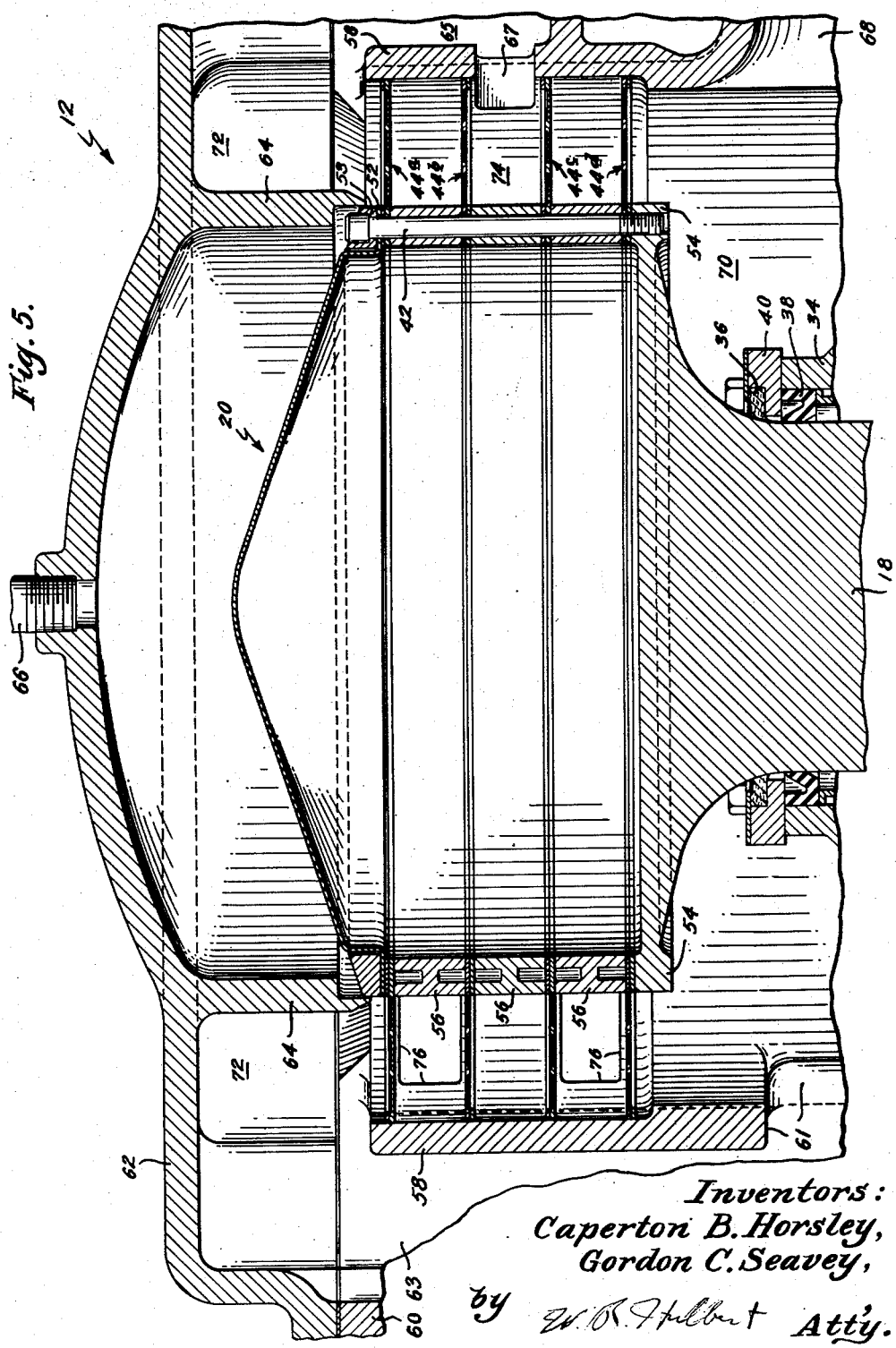

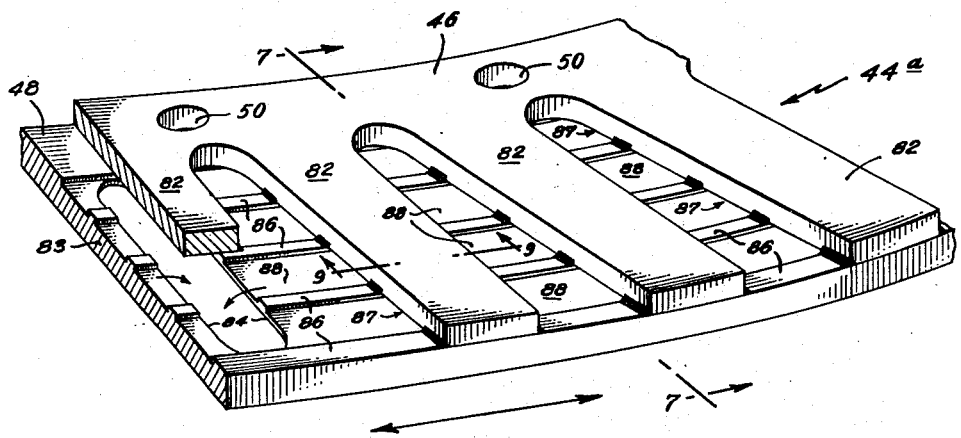
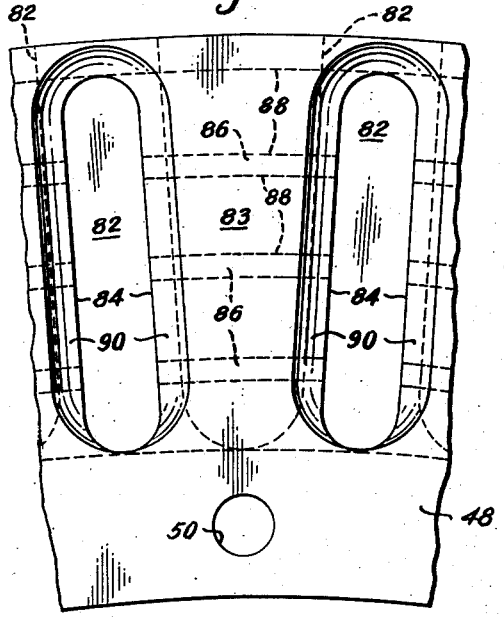
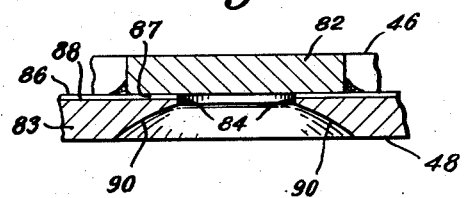
Inventors:
Caperton B. Horsley,
Gordon C. Seavey, Inventors:
Caperton B. Horsley,
Gordon C. Seavey,
by *G. R. Hilbert* Atty.

2,800,228

HIGH INTENSITY VIBRATORY SCREENING DEVICE

Caperton B. Horsley, Weston, and Gordon C. Seavey, Arlington, Mass., assignors to Sonic Research Corporation, Boston, Mass., a corporation of Massachusetts Application January 23, 1953, Serial No. 332,946

8 Claims. (Cl. 209—269)

This invention relates to vibratory screening devices and is more particularly concerned with a novel oscillatory sifter employing frequencies and accelerations of much higher order than those encountered in conventional apparatus.

Among the devices presently in use for screening and sifting purposes are rotary screens which may also be caused to vibrate at relatively low frequencies to assist the screening action. Also there are flat screens which are shaken to improve the screening. In all of these devices, so far as we are aware, the frequencies are relatively low and the forces of acceleration small. Usually these forces are not directed primarily in a direction to produce optimum screening action. In addition to these vibratory devices, various types of filters as well as settling tanks, etc., are some times employed for separating materials having suitable characteristics.

There are, nevertheless, some materials which, at least in an undiluted or otherwise unmodified state, defy successful screening or separation by means of any existing equipment or processes. For example, dilution, by the addition of a large volume of liquid, may make possible separation of some of these materials by one means or another, such as settling tanks, but the cleaned material may then be too dilute to serve its intended purpose and removal of the water may be impractical.

Among these difficult materials are oil well drilling mud, for example, from which it is desired to separate rock cuttings or particles of particular types or characteristics, either during the initial preparation of the mud or during subsequent use thereof. The specific gravity of the mud is usually high, higher than the rock cuttings and debris to be raised from the hole. Thus it is hard to clean the mud for reuse, for cuttings or other particles will not appreciably settle out in settling tanks and the consistency of the mud is such that the usual screening and sifting devices are unsatisfactory. When it is considered that some drilling mud is very expensive, and, in fact, in some cases may constitute a substantial portion of the cost of the well, it is evident that the provision of equipment for efficiently cleaning such mud, without diluting it, so that it may be reused time and again would constitute a very valuable contribution.

As another example of a material which is hard to sift on any conventional apparatus may be cited reclaimed waste paper which is ordinarily used in the manufacture of paper board or other low quality fibrous product. The waste paper as it comes to the mill usually contains substantial quantities of foreign materials which interfere with paper making, such as metal staples, paper clips, pins, and other particles and dirt, and separating them from the pulp is a very difficult matter.

We have discovered that difficult materials, such as the foregoing, as well as others, may be successfully screened or sifted out, without dilution or adverse effect, by our novel vibratory screening device which employs frequencies at least in the sonic (audible and above) range with amplitudes such that the accelerations of the screening members involve very intense forces, many times that of gravity, of the order of 1,000 G for example. The special arrangement of the screening members, as hereinafter described, coupled with the employment of frequencies and accelerations indicated, yield a novel and surprising result in permitting the successful separation of foreign bodies, or particular particles or fibers of predetermined characteristics, from mixtures which have heretofore been thought virtually incapable of separation on a commercial scale. The invention has special application where the dimensions of the particles to be separated are only very slightly greater than those of the particles comprising the vehicle in which they are suspended.

While we do not limit ourselves to any particular scientific theory for explaining the successful operation of our invention, we believe that the enormous forces of acceleration, exerted primarily in the proper direction with respect to the screening openings in our machine, permit us to employ very much smaller openings than the screening openings of any known conventional vibratory screen or sifter, nevertheless without clogging and even using the most difficult materials. We have found that a high concentration of very finely divided materials may be passed readily through the very fine openings between our vibratory members, thus permitting, as already indicated, the separation of foreign particles whose dimensions differ only slightly from the dimensions of the medium in which they are carried. Considerations of this nature are particularly applicable to the cleaning of oil well drilling mud, for example, where the rock cuttings, etc., suspended in the mud may be very small indeed and approach the mud particles themselves in size.

Having the foregoing in mind, it is an object of the present invention to provide a novel screening apparatus in which the members which provide the screening openings oscillate at frequencies and intensities of vibration very substantially higher than those encountered in conventional apparatus.

It is another object of the invention to provide a device of the type described which will successfully separate foreign bodies or any other desired particles which are suspended in fluent materials, which are difficult, if not impossible, to separate using conventional screening apparatus, the separation being accomplished without the need for any dilution of the material.

A further object of the invention is to provide a novel screening apparatus in which it is possible to employ very small screening openings without clogging.

Still a further object of the invention is to provide novel apparatus of the type described which may be so constructed as to screen very large quantities of materials with a minimum power requirement.

Further objects, features and advantages of the invention will become apparent from the following detailed description of a preferred embodiment thereof taken in connection with the accompanying drawings, in which like numerals refer to like parts in the several views, and in which:

Fig. 1 is a vertical section of one form of our novel screening device with some components shown in full lines;

Fig. 2 is a plan view on an enlarged scale of the sifter head casting with the cover removed to show the screening chamber within but disclosing only a fragment of the uppermost screening assembly;

Fig. 3 is a sectional view on a reduced scale taken on line 3—3 of Fig. 2;

Fig. 4 is a fragmentary sectional view taken on line 4—4 of Fig. 2;

Fig. 5 is a vertical cross-section on an enlarged scale of the sifter head, vibrating drum and screening assemblies showing the means of attachment of such assemblies to the drum;

Fig. 6 is a fragmentary detailed view in perspective of a single dual blade screening assembly, the double ended arrow indicating the direction of oscillation of the members and other arrows the direction of flow of the material being screened;

Fig. 7 is a sectional view taken on line 7—7 of Fig. 6;

Fig. 8 is a view from underneath of a portion of the assembly shown in Fig. 6;

Fig. 9 is a fragmentary sectional view taken on line 9—9 of Fig. 6;

Figure 10:
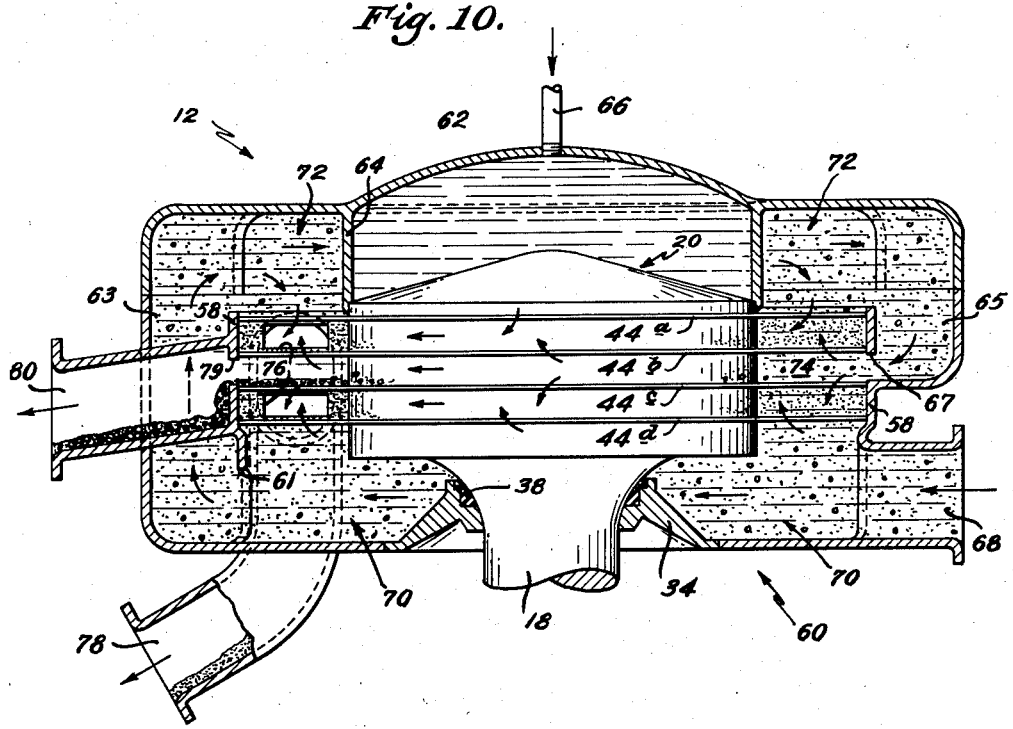
Fig. 10 is a diagrammatic sectional view of the sifter head proper, illustrating the direction of flow of materials therein.

The general mode of operation of our novel machine will be apparent from a consideration of Fig. 1 taken in connection with the disclosure of our patent already referred to, No. 2,584,053.

The sifter head is indicated generally by the numeral 12. This head is mounted upon a vertically arranged cylindrical casing 14, which in turn is held by a supporting casing 16, enclosing the driving mechanism. Within the head 12 and casings 14 and 16 is mounted a balanced spring-mass torsionally vibratory system comprising a main torsion bar 18 having attached to its upper end a drum 20 and to its lower end a massive inertia counterweight 22. The dimensions and elastic characteristics of the main torsion bar 18 are chosen in relation to the masses of the bodies 20 and 22 so that, taking into account the additional masses of the screening members described below and the damping forces exerted by the material being screened, the system will have a predetermined natural frequency of torsional oscillation with the mass 20 oscillating in opposite phase from the mass 22 and at a predetermined amplitude. This natural frequency is in the sonic range, as previously defined, and corresponds with the desired operating frequency for the particular material to be screened.

Figure 11:
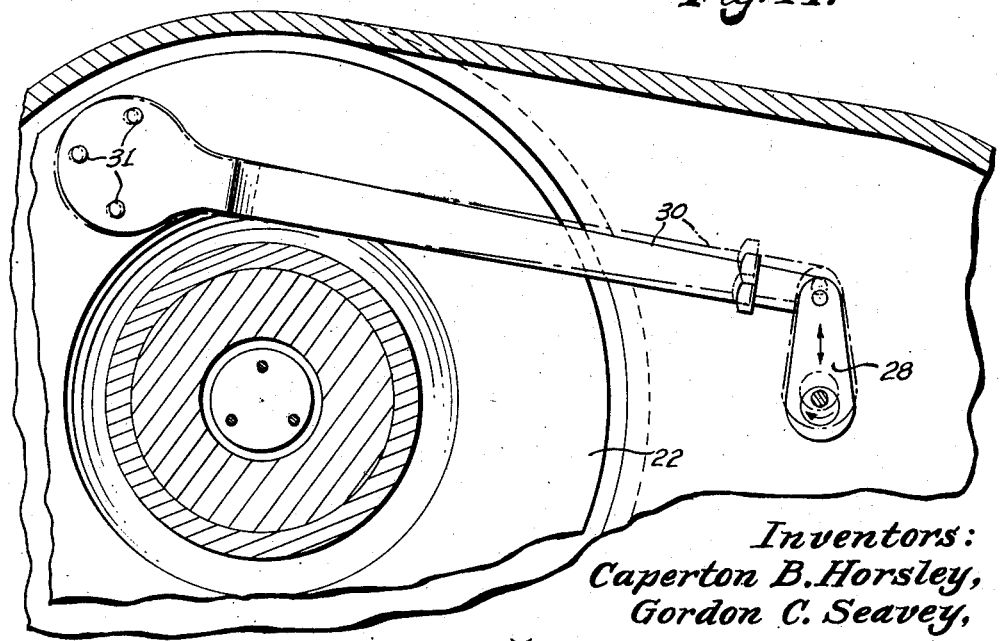
Fig. 11 is a fragmentary sectional view taken on line 11—11 of Fig. 1 with the eccentric arm shifted slightly to show the extent of the movement, more particularly illustrating the flexible drive for the two-mass torsionally oscillating system of which the vibrating drum constitutes a part.

Only one optional form of vibratory drive has been disclosed, somewhat diagrammatically, and here described since the details thereof do not form any part of the present invention. An electric motor 24 is connected through a gear box 26 to an eccentric 28. A flexible driving connection 30 of somewhat less elastic strength than the main torsion bar 18 connects the eccentric 28 to the counterweight 22, inducing rotational oscillation of the latter. As indicated by the double-ended arrow in Fig. 11 the movement of the eccentric drive 28 causes transverse oscillatory motion of the end of the flexible rod 30 to which it is linked. Since this flexible driving member is rigidly affixed to the counterweight 22 by three bolts 31, it is clear that continued oscillatory motion of the flexible arm 30 will quickly induce rotational oscillation of the counterweight 22. The oscillations of the counterweight are transmitted through the main torsion bar 18 to the drum 20. It will be evident that by operating the motor 24 at the proper speed with reference to the gearing, the system can be excited through the resilient exciter connection 30 to vibrate at the predetermined natural operating frequency. The inertia forces are balanced since the masses 20 and 22 oscillate in opposite phase and substantially the only forces on the bearings of the driving mechanism are due to the screening work done.

The spring-mass assembly is preferably supported on the casing 16 by a torsionally flexible but axially rigid thrust absorbing connector 32. We prefer to use a flexible connection of this type to obviate the difficulties of lubrication inherent in our vibratory system wherein the parts do not move in one direction a sufficient distance to carry lubricant to all the surfaces, as in a rotating bearing. The details of this thrust absorbing connection are fully disclosed and described in U. S. Patent No. 2,625,380, issued January 13, 1953, of one of the present applicants, Gordon C. Seavey, and entitled, "Thrust Absorbing Device for Rotationally Oscillating Systems." Consequently, further details thereof will not be set forth in the present specification but reference may be had to such patent for any information desired.

A more detailed description will now be given of the elements enclosed in the sifter head 12 and which, essentially, form the subject matter of the present invention. It will be observed from Fig. 1 that the main torsion bar 18 protrudes through a sealing collar 34. The enlarged cross-sectional view of Fig. 5 illustrates the various sealing components which are held within the collar 34 surrounding the bar 18. These comprise a sealing ring 36 of leather or fibrous material and a second sealing ring 38, of rubber or the like, separated from the ring 36 by the inturned portion of a flange 40 on the sealing collar 34. The purpose of the sealing collar 34 is to prevent the escape downwardly into the casing 14 of any of the materials to be sifted where they might cause interference with the driving mechanism mounted in the lower portion of the machine.

Further, as best seen in Fig. 5, there are attached to the periphery of the member 20 by means of a series of bolts 42, four ring-like dual-blade screening assemblies. For convenience each assembly has been designated by a separate numeral, 44$^a$, 44$^b$, 44$^c$, and 44$^d$, but it will nevertheless be understood that the assemblies are preferably identical and may be interchangeable.

Figs. 5–9 illustrate the component parts and particular arrangement of a single assembly, 44$^a$, for example. It will be seen that each screening assembly of blades comprises an upper ring 46 and a lower ring 48, which may be formed from relatively thin stainless steel plates, or other suitable rugged material, held to each other and to the periphery of the drum 20 by mounting bolts 42 (Fig. 5) which fit mounting apertures 50 near the inner circumferential portion of each ring. The drum 20 is provided with outwardly extending upper and lower flanges 52 and 54 for holding the rings. The blade assemblies are held in spaced relation to each other by spacing rings 56. The outer edges of the blade assemblies closely fit the upper inner surface of a cylindrical dividing wall portion 58 of the casting 60. Thus the materials presented to the upper sides of assemblies 44$^a$ and 44$^c$ and to the lower sides of assemblies 44$^b$ and 44$^d$ may pass through the screening openings (hereinafter described) in the assemblies and into the zone between such assemblies as indicated by the arrows in Fig. 10.

From the overall view of Fig. 1, it will be observed that the sifting head 12 comprises a casting 60 and a cover 62 which fits the top of the casting 60. The cover 62 has a downwardly directed generally cylindrical wall 64 whose lower edge fits closely the upper annular edge of the drum 20, as best seen in Fig. 5. In order to prevent escape of the material being sifted into the region above the drum 20 and below the central portion of the cover 62, water, or other suitable fluid, under pressure is admitted to this zone through an inlet 66 and the pressure existing at the joint between the upper marginal edge of the drum 20 and the wall 64 prevents the entry of any of such material.

The material to be screened, which may be a slurry of fibrous materials or of finely divided particles, such as oil well drilling mud, is admitted to the casting 60 through an inlet 68. As best seen in the diagrammatic representation of Fig. 10, the inlet 68 opens into the cylindrical inlet chamber 70 (the lower subdivision in the circular casting 60). This chamber functions as an initial receiving chamber as well as a flow chamber to the upper chamber 72 and a sifting chamber supplying slurry to lowermost sifting blade assembly 44$^d$. Through the opening 61 and upwardly extending slurry feed duct 63, the chamber 70 is connected to the annular upper chamber 72 in the cover. This chamber functions as a sifting chamber for the uppermost blade assembly 44$^a$ and through ducts 65 and 67 also functions as a flow chamber to the annular space 74 located between blade assemblies 44$^b$ and 44$^c$, outer wall 58 and middle spacer ring 56. The direction of flow is indicated by arrows in Fig. 10, from which it will be observed that unsifted slurry is presented, under any desired pressure, first to the underside of the lowermost assembly 44$^d$, then to the upper side of the assembly 44$^a$, and finally simultaneously to the lower side of the companion assembly of blades 44$^b$ and the upper side of the assembly 44$^c$. Virtually all the particles which are of sufficiently small size to pass through the screening openings (hereinafter described) in the assembly flow through ports 76 to an outlet 78. The larger particles which will not pass through the screening openings are carried along by the flowing materials and are eventually discharged through another outlet 80.

In the specific embodiment shown, it will be observed that four blade assemblies operate in pairs, the second pair, in effect, being a duplicate of the first. Regarding only the pair of assemblies 44$^c$ and 44$^d$, it is clear that the outer and internal walls of the casting 60 and blade assemblies themselves define a sub-chamber 70 for presenting unsifted material to one side of the blade assembly 44$^d$. The zone between the blades 44$^c$ and 44$^d$ and cooperating walls of the casting define a second sub-chamber receiving the sifted material which has passed through the screening openings. Finally, the zone above the blade assembly 44$^c$ and the wall portion 58 define a third sub-chamber with an outlet port 79 for the rejected material which has not passed through either screening assembly 44$^d$ or 44$^c$. With the addition of assemblies 44$^a$ and 44$^b$ the sub-chamber 70 is duplicated by the sub-chamber 72; the zone between the blade assemblies 44$^a$ and 44$^b$ duplicates he corresponding sub-chamber formed by the assemblies 44$^c$ and 44$^d$; and the third sub-chamber adjacent the outlet port 79 is common to both pairs of screen assemblies.

Returning to Figs. 5–9, a more detailed treatment will now be given of the specific screening assembly construction and arrangement. As already indicated, each assembly comprises a pair of adjacent plate-like screening members 46 and 48. The upper plate 46 has radially outwardly extending blades or fingers 82 and the lower plate 48 is provided with a corresponding series of blades 83 defining elongated slotted openings 84 each of which is arranged exactly beneath a blade 82 of the other set. The upper surfaces of the blades 83 are provided with a series of annular ridges or lands 86 defining between them a corresponding series of shallow annular grooves 88. As best seen in Figs. 7 and 9, the upper surfaces of the lands 86 are rigidly affixed, as by silver soldering or welding, to the adjacent lower surfaces of the blades 82. Inasmuch as both sides of each blade 82 overlap to some slight extent the adjacent lateral edges of a pair of lower blades 83, the clearances forming the screening openings 87 through which must pass the sifted material are determined by the depth of the shallow grooves 88. Likewise, as best seen in these two figures, the material of the lower blades 83 surrounding the slotted openings 84 is cut away so that the walls 90 of each blade 83 are gently sloped. Thus each screening opening is of accurately predetermined size and is normal to the direction of vibration. The assemblies are mounted on the oscillating drum so that in each case the blades 82 are on the side to which is fed the unsifted material. The vertical walls of these blades assist the sifting action in tending to force the material through the screening openings. On the other hand, the gently sloping walls 90 of the lower blades tend to expel from between them the material which has passed through the screening openings, making for a maximum rate of flow.

While in the drawings we have shown the blades 82 as well-defined fingers free at their tips, it is clear that their tips might equally well be joined so as to form the intervals between the blades as openings, similar to the openings 84 between the other blades 83. Likewise it is immaterial in which of the sets of blades are formed the lands and grooves.

The depth of the grooves 88 in this embodiment of the invention is critical since, as indicated above, the size of the screening openings 87 is determined by such depth. Therefore, if the blades 82 and 83 are to have any appreciable length it is evident that they must be reinforced in some manner to prevent springing further open at the areas near their centers due to the great forces which may be exerted by material wedged between them during operation. It is for this reason that we have provided the annular lands 86 of a predetermined height (say .002 inch), dependent upon the dimensions of the material being screened, at frequent radially spaced intervals and have anchored the blades 82 to them in the manner previously indicated, thus adding to the rigidity of the blades and assuring that the dimensions of the screening openings will remain entirely uniform from one end to the other.

When the blade-supporting drum 20 is oscillated rotationally at a high frequency and with considerable amplitude, the plates 46 and 48 oscillate in the direction indicated by the double-ended arrow in Fig. 6 and with even greater amplitude since they extend radially outwardly from the drum. As already indicated, the forces of acceleration at the blade tips may well be of the order of 1,000 G. These forces are enormously greater than the maximum corresponding forces of acceleration which are usually encountered in conventional vibratory screens. These forces are likewise of sufficient magnitude to cause even the most difficult and slimy materials to pass through the extremely narrow screening openings while rejecting larger particles and bodies of foreign matter which it is desired to separate. Furthermore, the relative motion between the slurry or other material to be screened and the screening members which define the screening openings is substantially only in a direction normal to the screening openings (bearing in mind that the screening openings in the embodiment herein disclosed are not the slots 84, but rather the elongated narrow generally rectangular spaces indicated by the numeral 87 between the bottoms of the grooves 88 and the under surfaces of the blades 82, as clearly seen in Fig. 7). From the direction of oscillation, it is clear that the material to be screened is forced into the screening openings in a direction which corresponds with the direction of oscillation and the material which passes through the openings is forced away from the blades, the flow through the blades being indicated by the small arrows at the left-hand side of Fig. 6.

As stated above, an advantage of the apparatus according to the present invention is the orientation of the screening openings in the direction of vibration of the screening members and the presentation of the material to be screened in a direction normal to such openings. Such orientation is in marked contrast to the lack thereof which is characteristic of many prior art screening devices.

The clearance between the bottom surfaces of the blades 82 and the upper edge surfaces of the blades 83 may be proportioned with reference to the particular slurry or other fluent material which is to be passed through the sifting head, having in mind the size and nature of the foreign bodies or other particles which are to be removed therefrom. Naturally, if only larger particles are to be removed, the clearances may be made greater, with corresponding more rapid flow. On the other hand, if it is desired to remove particles whose dimensions are close to the dimensions of the constituent particles of the vehicle by which they are carried, then the grooves 88 must be made extremely shallow and the speed of flow will be correspondingly reduced.

By way of example in an embodiment of the invention especially adapted for screening oil well drilling mud having a particle size of .002 inch or less, we may employ screening assemblies having a diameter of 15 inches. The drum 22 is oscillated rotationally at a frequency of about 200 cycles per second and each blade tip moves approximately one-fourth of an inch first in one direction and then in the other, giving an over-all amplitude of approximately one-half inch. The grooves 88 are of the order of .004 inch in depth and distance between the lands 86 may be three-eighths of an inch. Rock cuttings, the large majority of which are more than .004 inch in diameter, will be readily separated without clogging and with a flow through each screening assembly of fifty gallons per minute or more. It will be understood that the foregoing specific illustration is cited only by way of example and not by way of limitation as to the scope of the invention. For materials of different characteristics and different dimensions, such as a fibrous slurry, it may be found that different frequencies and amplitudes of operation may be desirable and screening openings of larger or smaller dimensions or different shapes employed. Such adjustments are within the skill of a competent engineer and may be varied to meet the conditions to be expected in any particular use of our novel screening device.

In the operation of our novel sifter, referring now more particularly to Figs. 1 and 10, the motor 24 is started and through the eccentric 28 and resilient exciter connection 30, the two-mass torsionally spring system comprising the blade-carrying drum 20, counterweight 22 and the torsion bar 18 is brought to resonant oscillation. Slurry or other material to be sifted is led into the lower treatment chamber 70 through the inlet 68 and the finer material immediately starts to pass through the narrow screening openings defined by the blades 82 and 83. The remaining unsifted material circulates to the upper chamber 72 and intermediate chamber 74. The material which passes through the screening openings of the several blade assemblies is discharged through the ports 76 to the outlet 78. Material which is too large is rejected and carried by the flow to be eventually discharged through the rejected material outlet 80. Leakage of material above the head 20 is prevented by the fluid seal provided by water furnished under pressure through the conduit 66. Escape of such material in a downwardly direction is prevented by sealing rings 36 and 38.

We have found that oil well drilling muds and slurries of reclaimed paper fibers which have heretofore been most difficult to screen or sift may successfully be screened on our novel sifter at rates of flow which make the operation highly efficient and economical. The materials may be screened in their usual state without dilution. The power consumption of our high intensity vibratory apparatus is nevertheless not great due in large measure to the balanced spring-mass torsionally oscillating system which we provide. In such a system a minimum of energy is wasted in the transmission of useless vibrations to the foundation or in wearing the bearings. Furthermore, use of the balanced vibratory system permits the employment of a frame and other supporting components of considerably reduced weight and strength, thus making for greater economy of construction materials used.

While we have herein disclosed and described a presently preferred embodiment of the invention, it will nevertheless be understood that the same is susceptible of numerous modifications and changes, some of which have hereinabove been pointed out, by those skilled in the art nevertheless within the scope of the appended claims.

We claim:

1. A screening device for separating materials comprising a screening assembly, said assembly including at least two sets of parallel closely spaced blades having intervals between adjacent blades of each set, the blades of one set being opposite the intervals between blades of the other set with the adjacent blades overlapping each other, the adjacent edges of said overlapping blades defining narrow screening openings therebetween which face in the same direction as the planes of said blades, an oscillatory driving device in driving connection to said assembly for oscillating said assembly at a sonic frequency in a direction generally within its plane, means associated with said assembly for presenting unsifted material to one side of said assembly, means associated with said assembly for removing the material which passes through said screening openings from the other side of said assembly and means associated with said assembly for removing rejected material which fails to pass through said screening openings.

2. A screening device for separating materials comprising a massive drum, a screening assembly affixed to the periphery of said drum, said assembly comprising at least two sets of parallel closely spaced blades having intervals between adjacent blades of each set, the blades of one set being opposite the intervals between blades of the other set with the adjacent blades overlapping each other, the adjacent edges of said overlapping blades defining narrow screening openings therebetween which face in the same direction as the planes of said blades, a torsion bar connected to said drum, a massive counterweight connected to the other end of said bar, said drum, bar and counterweight comprising a spring-mass vibratory system having a predetermined natural frequency of torsional oscillation with said drum and counterweight oscillating in opposite phase and said assembly oscillating in a direction generally within its plane, an oscillatory driving device in driving connection to a member of said system for oscillating said system at said frequency, means associated with said assembly for presenting unsifted material to one side of said assembly, means associated with said assembly for removing the material which passes through said screening openings from the other side of said assembly, and means associated with said assembly for removing rejected material which fails to pass through said screening openings.

3. A screening device for separating materials comprising a casing, a screening assembly mounted within said casing, said assembly comprising at least two sets of parallel closely spaced blades the blades of each set having intervals therebetween, the blades of one set being opposite the intervals between blades of the other set with the adjacent blades overlapping each other, the overlapping edges of said blades defining narrow screening openings therebetween which face the same direction as the planes of said blades, and an oscillatory driving device in driving connection to said assembly for oscillating said assembly at a sonic frequency in a direction generally within its plane, said casing having walls defining with said assembly a chamber for presenting unsifted material to one side of said screening openings and a chamber on the other side of said screening openings for receiving the material which passes therethrough and said casing further providing another chamber to receive rejected material which fails to pass through said screening openings.

4. A screening device for separating materials comprising a casing, a massive drum mounted within said casing, a screening assembly mounted on the periphery of said drum, said assembly comprising at least two sets of parallel closely spaced blades the blades of each set having intervals therebetween, the blades of one set being opposite the intervals between blades of the other set with the adjacent blades defining narrow screening openings therebetween which face in the same direction as the planes of said blades, a torsion bar connected to said drum, a massive counterweight attached to the other end of said bar, said drum, bar and counterweight comprising a spring-mass vibratory system having a predetermined natural frequency of torsional oscillation at least within the sonic range with said drum and counterweight oscillating in opposite phase and said assembly oscillating in a direction generally within its plane, an oscillatory driving device in driving connection to a member of said system for oscillating said system at said frequency, said casing having internal walls defining with said assembly a chamber for presenting unsifted material to one side of said screening openings, and a chamber on the other side of said screening openings for receiving the material which passes therethrough and said casing also providing another chamber to receive rejected material which fails to pass through said screening openings.

5. A screening device for separating materials comprising a casing, a massive drum mounted within said casing, a screening assembly mounted on the periphery of said drum, said assembly comprising at least two sets of parallel closely spaced blades having intervals between adjacent blades of each set, the blades of one set being opposite the intervals between blades of the other set with the adjacent blades defining narrow screening openings therebetween which face in the same direction as the planes of said blades, radially spaced portions of said blades being rigidly attached to each other to maintain said screening openings of uniform size throughout their length, a torsion bar connected to said drum, a massive counterweight attached to the other end of said bar, said drum, bar and counterweight comprising a spring-mass vibratory system having a predetermined natural frequency of torsional oscillation at least within the sonic range with said drum and counterweight oscillating in opposite phase and said assembly oscillating in a direction generally within its plane, an oscillatory driving device in driving connection to a member of said system for oscillating said system at said frequency, means associated with said assembly for presenting unsifted material to one side of said screening openings, means associated with said assembly for removing the material which passes therethrough and means associated with said assembly for removing rejected material which fails to pass through said screening openings.

6. A screening device for separating materials comprising a rotationally oscillatable massive member having a generally cylindrical surface, at least two series of regularly spaced blades extending radially outwardly from said surface having intervals between adjacent blades of each series, the blades of one series being generally opposite the intervals between the blades of the other series with the edges of adjacent blades overlapping each other, the surfaces of the blades of at least one of said series which overlap corresponding surfaces of blades of the other series having shallow grooves cut out therefrom forming a series of concentric lands and grooves, said lands being rigidly attached to adjacent portions of said overlapped surfaces and the remaining portions of said overlapped surfaces defining with the bottoms of said grooves narrow screening openings facing in the same direction as the planes of said blades, an oscillatory driving device in driving connection to said massive member for oscillating said massive member rotationally at a sonic frequency in a direction such that said blades move substantially only within their own planes, means associated with said series of blades for presenting material to be screened to one of said series of blades, means associated with said series of blades for removing material which has passed through said screening openings and means associated with said series of blades for removing rejected material which fails to pass through said screening openings.

7. A screening device for separating materials comprising a rotationally oscillatable massive member having a cylindrical surface, at least one pair of annular plates rigidly affixed to said cylindrical surface and in parallel face to face relation with each other, each of said plates being provided with a series of regularly spaced radially outwardly extending blades defining intervals therebetween, the blades of one series being generally opposite the intervals between blades of the other series with the edges of adjacent opposed blades overlapping each other, the surfaces of the blades of at least one of said series which are adjacent corresponding surfaces of blades of the other series having shallow grooves cut out therefrom forming a series of lands and grooves concentric with the axis of said plates, said lands being rigidly attached to portions of said adjacent surfaces and the remaining portions of said adjacent surfaces defining with the bottoms of said grooves narrow screening openings facing in the same direction as the planes of said plates, an oscillatory driving device in driving connection to said massive member for oscillating said massive member rotationally at a sonic frequency in a direction such that said plates move substantially only within their own planes, means associated with said plates for presenting material to be screened to one of said series of blades, means associated with said plates for removing material which has passed through said screening openings and means associated with said plates for removing rejected material which fails to pass through said screening openings.

8. A screening device for separating materials comprising a screening assembly, said assembly including at least two sets of parallel closely spaced blades having intervals between adjacent blades of each set, the blades of one set being opposite the intervals between blades of the other set with the adjacent blades overlapping each other, the adjacent edges of said overlapping blades defining narrow screening openings therebetween which face in the same direction as the planes of said blades, an oscillatory driving device in driving connection to said assembly for oscillating said assembly at a sonic frequency in a direction generally within its plane, means associated with said assembly for presenting unsifted material to one side of said assembly, means associated with said assembly for removing the material which passes through said screening openings from the other side of said assembly and means associated with said assembly for removing rejected material which fails to pass through said screening openings, the walls of the blades on the input side of said assembly lying in planes generally transverse to the direction of oscillation and the walls of the blades on the output side thereof being sloped away from said screening openings generally in the direction of oscillation.

References Cited in the file of this patent

UNITED STATES PATENTS

| | | |
|---|---|---|
| 331,304 | Kron | Dec. 1, 1885 |
| 841,585 | Seck | Jan. 15, 1907 |
| 1,111,217 | Cole | Sept. 22, 1914 |
| 2,367,478 | Weisbach | Jan. 16, 1945 |
| 2,584,053 | Seavey et al. | Jan. 29, 1952 |
| 2,625,380 | Seavey | Jan. 13, 1953 |